ANDRE ROCHE
ROBERT AMANRICH AND
GILBERT COUSSERANS
INVENTORS 3,667,904
PROCESS FOR THE SEPARATION OF MIXTURES OF PHOSPHORIC AND NITRIC ACID
Andre Roche and Robert Amanrich, Toulouse, and Gilbert Cousserans, Portet, France, assignors to Azote et Produits Chimiques S.A., Toulouse, France
Continuation-in-part of application Ser. No. 698,829, Jan. 18, 1969. This application Apr. 13, 1970, Ser. No. 28,118
Claims priority, application France, Jan. 26, 1967, 92,529; Aug. 17, 1967, 118,085
Int. Cl. C01b 25/28
U.S. Cl. 23—107       5 Claims

ABSTRACT OF THE DISCLOSURE

This invention is directed to a process for the preparation of monoammonium phosphate by ammoniation of mixtures of phosphoric and nitric acids in the presence of at least partially water-miscible $C_1$ to $C_8$ alkanol characterized in that the alcoholic solution to be ammoniated contains 16 to 8% of water.

---

Figure 1:
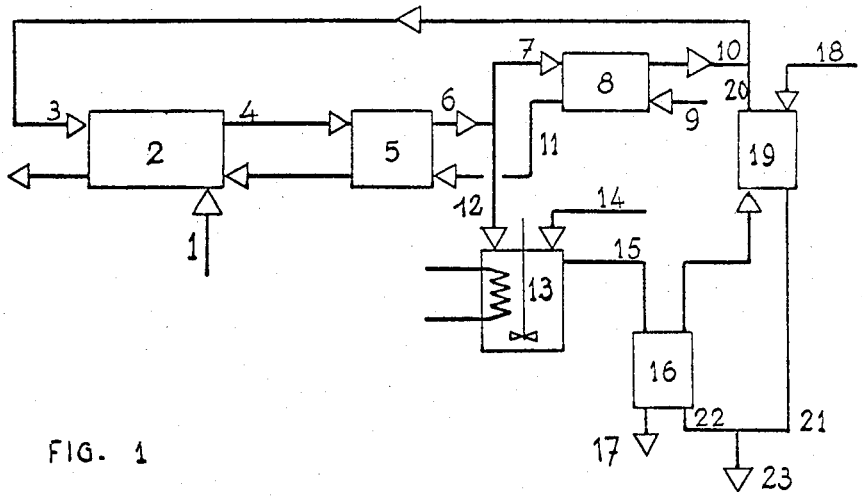

This is a continuation-in-part of Ser. No. 698,829, filed Jan. 18, 1968 now abandoned.

The industrial separation of binary mixtures of phosphoric and nitric acid is generally carried out by distillation or by selective extraction by means of a suitable solvent.

Separation by distillation presents serious drawbacks mainly from viewpoint of equipment corrosion. Furthermore, the operation efficiency is markedly affected by the impossibility of totally extracting nitric acid from phosphoric acid, and by partial decomposition of nitric acid. The separation of nitric acid-phosphoric acid mixtures by liquid-liquid extraction is an onerous operation because it is very complex and still further complicated by the necessity of recovering and regenerating the solvent.

In all these cases, the production of concentrated solutions of phosphoric acid involves consumption of large amounts of the thermal energy.

The present invention relates to a process which obviates the above-outlined drawbacks.

The object of the present invention is a process of ammoniating a mixture of phosphoric acid and nitric acid in the presence of $C_1$ to $C_8$ aliphatic alcohols which allows the precipitation of mono and/or diammonium phosphate practically free of ammonium nitrate.

It was found that when ammoniating, in the presence of an alcohol, solutions containing phosphoric acid, nitric acid and decreasing quantities of water, the following results are obtained.

For percentages (in weight) of water higher than 16%, no ammonium phosphate precipitates and an aqueous solution containing both ammonium phosphate and ammonium nitrate is obtained. When the percentage of water ranges from 16 to 8%, practically pure ammonium phosphate is precipitated, the major part of ammonium nitrate remaining in the aqueous solution. The yield of precipitated ammonium phosphate increases with decreasing percentages of water and can be higher than 90% for water concentrations lower than 14%. When the percentage of water is lower than 8%, increasing quantities of ammonium nitrate are precipitated together with ammonium phosphate.

Totally miscible alcohols such as methanol can be used. In this case, ammonium phosphate precipitates from the aqueous solution which contains the alcohol and a two-phase system is obtained. Preferably, non miscible alcohols such as isoamyl alcohol, isobutanol, pseudohexyl alcohol, OXO alcohols, etc., are utilized. In the latter case, a layer of alcohol separates from a layer of aqueous solution and the system obtained comprises three phases.

By selecting the neutralization pH value, it is possible to direct the reaction towards the formation of monoammonium or diammonium phosphate precipitate. The diacidic salt is formed exclusively at pH values ranging between 3.0 and 5.5, and a mixture of mono- and diammonium phosphates in all proportions is obtained in the pH range from 5.5 to 7.5, whereas the monoacidic salt is formed exclusively at higher pH values, comprised between 7.5 and 8.5.

Application of the process of the invention is particularly advantageous in the separation of phosphoric and nitric acids present in the solutions from the nitric acid decomposition of natural phosphates from which the major part of calcium salts have been separated. It is also used for separating nitric and phosphoric acids in solutions resulting from metal pickling processes. More generally, it is applied to solve problems arising in the separation of any phosphoric and nitric acid mixture.

According to a first embodiment, an aqueous mixture containing practically only phosphoric and nitric acids is treated. Then the alcohol is merely added to the acids.

In this case, the water percentage is usually regulated by adding suitable quantities of solvent to the aqueous mixture of acids.

According to a second embodiment of the invention, aqueous solutions of phosphoric and nitric acids containing mineral salts and/or impurities. Then the phosphoric and nitric acids are extracted from the solution by means of a partially miscible alcohol. The alcoholic extract containing the nitric and phosphoric acids is separated from the aqueous solution containing the mineral salts and/or impurities, the water content of the extract is adjusted to the desired value and the extract is then ammoniated.

In this case, the water percentage of the extract is generally regulated by adding suitable quantities of water.

Advantageously, this addition takes place in a purification step before ammoniation step. In this purification step the extract is washed with controlled quantities of water or diluted solutions. According to the process of the invention, determined quantities of water are added to the extract by regulating the quantities of solutions introduced and withdrawn from the purification step.

This second embodiment of the invention is particularly advantageously applied to solutions obtained by nitric acid decomposition of phosphate ores, the major part of calcium salts being separated during extraction step. Nevertheless, part of calcium nitrate contained in the nitric acid attack mixture can advantageously be separated, before extraction, by refrigeration and crystallization.

The following examples are merely illustrative of the invention and should not be interpreted as limiting the same to the particular conditions described therein. Percentages therein are by weight.

EXAMPLE 1

In a first test, a mixture of acids containing 35% of $H_3PO_4$, 10% of $HNO_3$ and 55% of water, is ammoniated up to pH 5. There is obtained precipitate of monoammonium phosphate corresponding to half of the original phosphoric acid and containing about 2% of ammonium nitrate. The aqueous solution in equilibrium with such crystals contains the mixture of remain ammonium salts.

In a second test, the same mixture of acids is ammoniated to pH 5 but isoamyl alcohol is added in the proportion of 5 parts per 1 part (by weight) of the aqueous solution of the acids and an alcoholic solution containing 14% of water is obtained. The following three phases separate in the decreasing order of density:

(1) A monoammonium phosphate precipitate corresponding to 95% of the initial phosphoric acid.

(2) An aqueous solution containing monoammonium phosphate from the remainder of the initial phosphoric acid and ammonium nitrate corresponding to 60% of the initial nitric acid.

(3) A light phase containing the remainder of the ammonium nitrate as well as substantially all the isoamyl alcohol utilized.

EXAMPLE 2

2055 grams of methanol are added to 411 grams of an aqueous solution containing 29.2% of $H_3PO_4$ and 21.2% of $HNO_3$ and a solution containing 10% of water is obtained. Then neutralization is carried out with ammonia gas to pH 5. The system then comprises two phases:

(1) A crystalline precipitate composed of pure monoammonium phosphate corresponding to 96% of the original phosphoric acid and representing, after dehydration and drying, 135 grams of pure $NH_4H_2PO_4$.

(2) An aqueous solution containing the methanol, the totality of nitric acid as ammonium nitrate and the remainder of the phosphoric acid as monoammonium phosphate.

EXAMPLE 3

4650 grams of 2-ethyl-1-butyl alcohol (so-called "pseudohexyl" alcohol) are added to 1000 grams of an aqueous solution containing 25% of $H_3PO_4$ and 30% of $HNO_3$ and a solution containing 10% of water is obtained. The pH value of the mixture is then brought up to 5.5 by introducing ammonia gas.

After filtering, the following phases are obtained:

(1) A solid phase which, after drying, is constituted by 264 grams of pure monoammonium phosphate representing 90% of the original phosphoric acid.

(2) 400 grams of aqueous phase containing 28.6 grams of monoammonium phosphate, 171 grams of ammonium nitrate and traces of the alcohol.

(3) 5082 grams of alcoholic phase containing 4650 grams of the ethyl-butyl alcohol, 222 grams of water and 210 grams of ammonium nitrate.

EXAMPLE 4

The process of the invention is applied to the purified extract obtained by treating mother liquors resulting from the decomposition, with nitric acid, of phosphatic ore and containing 35% of $P_2O_5$, with a mixture of $C_5$ OXO synthesis alcohols contains n-amyl, active amyl and isoamyl alcohols. The mother liquors are preliminarily cooled down to 10° C. which makes it possible to remove about 70% of the calcium as nitrate tetrahydrate, by decanting.

Referring to FIG. 1 of the drawings, the mother liquors are fed at 1 into extraction chamber 2 wherein they are treated in counter-flow with alcoholic solvent introduced at 3, crude extract being discharged at 4 and being then purified in extraction battery 5. Purified extract leaving at 6 has then the following composition by weight:

| | Percent |
|---|---|
| $H_3PO_4$ | 4.94 |
| $HNO_3$ | 3.60 |
| Water | 8.50 |
| $C_5$ OXO alcohols | 82.86 |
| $Ca(NO_3)_2$ | Traces |

One fraction of this purified extract from 5 is subjected to further water extraction in extractor 8 to which it is fed via 6 and 7, water being supplied at 9. It is thus freed of the totality of contained phosphoric acid. The solvent is recycled in part via 10 and 3 back to the extraction chamber 2, and the aqueous solution is led via 11 back to extraction battery 5 where it washes crude extract. The other fraction of purified extract from 5—this fraction being greater than the first-mentioned fraction—is treated at the rate of 29.4 tons per hour in a tank 13 fitted with an agitator and a cooling coil and supplied with ammonia via inlet conduit 14, the pH of the contents of the tank being maintained at between 3.0 and 3.5. A three-phase mixture is discharged via 15 said mixture being dewatered and decanted in chamber 16, yielding:

(1) A solid phase, which is discharged at 17, constituted by 1.66 T./h.[1] of pure monoammonium phosphate, after drying;

(2) An aqueous phase substantially free of alcohol, containing:

0.94 T./h. of ammonium nitrate $NH_4NO_3$
0.02 T./h. of monoammonium phosphate $NH_4H_2PO_4$
1.10 T./h. of water; and (3) An alcoholic phase representing:

0.04 T./h. of ammonium nitrate $NH_4NO_3$
0.01 T./h. of monoammonium phosphate $NH_4H_2PO_4$
1.30 T./h. of water
14.30 T./h. of $C_5$ OXO alcohols The alcoholic solution is washed in counter-flow with 1 T./h. of water, introduced at 18, in column 19, the alcoholic fraction thus separated being recycled via 20 and 3 to extraction chamber 2. Aqueous solutions discharged via 21 and 22 are collected at 23, from which they can be put to use "as is," or can be concentrated and evaporated for instance by granulation.

The overall efficiency of the phosphoric acid recovery as pure $NH_4H_2PO_4$, calculated with respect to the original $P_2O_5$ content of the phosphates, is 97.8%. The corresponding steam consumption per ton of $P_2O_5$ produced is 2.5 T. Such a consumption reaches 9.45 T. when the conventional method is used, i.e., by water extraction of the totality of the phosphoric acid, the aqueous solution being assumed concentrated to the same $P_2O_5$ content as monoammonium phosphate.

EXAMPLE 5

The product from the nitric acid decomposition of phosphate as described in the preceding example is subjected to further cooling, more severe, to —10° C. which enables the removal of 25% more of calcium as nitrate tetrahydrate, $Ca(NO_3)_2.4H_2O$. The mother liquors will thus assay 30% of $P_2O_5$ and 8% of calcium nitrate.

Figure 2:
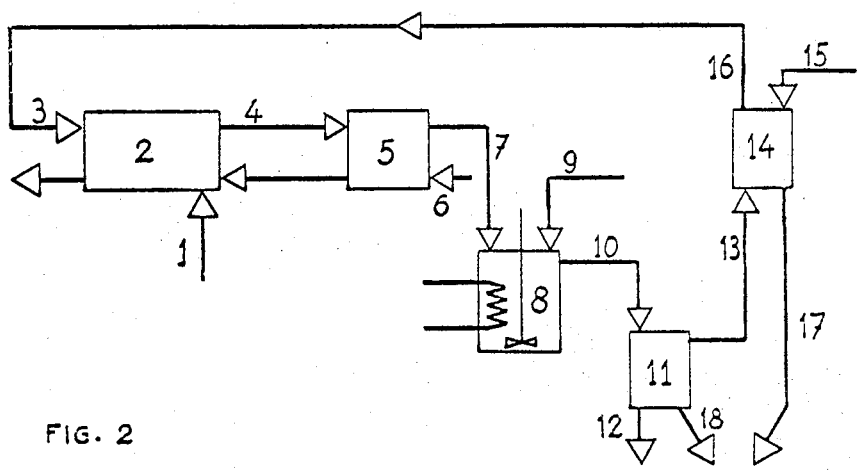

Referring to FIG. 2 of the drawings, the mother liquors supplied at 1 are treated in counter-flow with isoamyl alcohol introduced at 3 into extraction chamber 2. Crude extract leaving at 4 is purified by water washing in extraction battery 5 supplied with water at 6. Purified extract, leaving at 7, still containing traces of calcium nitrate, has the following composition by weight:

5.00% of phosphoric acid $H_3PO_4$
2.40% of nitric acid $HNO_3$
8.50% of water
84.10% of isoamyl alcohol The 29 T./h. of thus-purified extract are fed simultaneously at 7 with ammonia, supplied at 9, into tank 8 fitted with an agitator and cooling means, the pH value being maintained in the 7.5 to 8.5 range.

A three-phase mixture is collected via 10 and subjected to dewatering and decantation in a decantation apparatus 11 from which there are withdrawn:

(1) A solid phase, via 12, which, after drying, represents 1.852 T./h. of pure diammonium phosphate.

(2) An aqueous phase, via 18, substantially free of alcohol and constituted by:

0.60 T./h. of ammonium nitrate $NH_4NO_3$
0.08 T./h. of diammonium phosphate $(NH_4)_2HPO_4$
0.80 T./h. of water, and

[1] T./h.=ton(s) per hour.

(3) An alcoholic solution, via 13, containing:

0.277 T./h. of ammonium nitrate $NH_4NO_3$
0.018 T./h. of diammonium phosphate $(NH_4)_2HPO_4$
1.565 T./h. of water
14.389 T./h. of isoamyl alcohol The above solution is washed in washer 14 with water, supplied at 15, as in the preceding example, isoamyl alcohol being recycled via 16 and 3 to extraction chamber 2. Alcohol-free solution, leaving at 17 from 14, is mixed with aqueous phase, leaving at 18, and valorized as a liquid or after concentration and evaporation. The overall efficiency of $P_2O_5$ separation calculated from the content of the starting natural phosphates is higher than 90%.

If neutralization of the purified extract with ammonia is carried out at a pH value ranging from 5.5 to 7.5, mixtures of mono- and diammonium phosphates in the desired proportion are obtained with the same efficiency.

EXAMPLE 6

Figure 3:
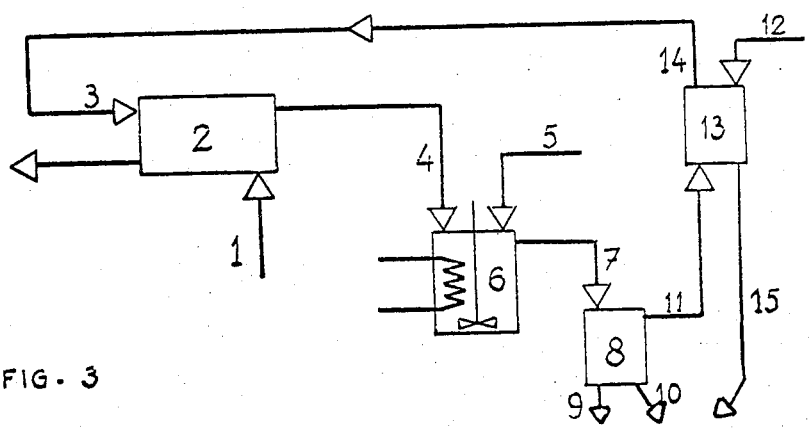

The mother liquors of the preceding example, after being subjected to two-step cooling to +10° C. and −10° C., are fed at 1 into extraction battery 2 shown in FIG. 3 of the drawings, wherein they are treated in counter-flow with isobutyl alcohol supplied at 3. Crude extract, leaving at 4, of the following composition by weight:

8.45% of phosphoric acid $H_3PO_4$
2.58% of nitric acid $HNO_3$
12.00% of water
0.20% of calcium nitrate $Ca(NO_3)_2$
76.77% of isobutanol is treated with ammonia, supplied at 5, in tank 6 fitted with an agitator and cooling means, the pH value being maintained in the range from 3.5 to 5.5. Three-phase mixture is continously drawn off from tank 6 via 7, and is separated in dewatering and decantation equipment 8, thus making it possible to obtain from 17.2 T./h. of crude extract:

(1) A solid phase, discharged at 9, which, after drying, represents 1.628 T./h. of monoammonium phosphate containing 1.85% of dicalcium phosphate.

(2) 1.007 T./h. of aqueous solution discharged at 10, substantially free of alcohol and containing:

0.432 T./h. of ammonium nitrate $NH_4NO_3$
0.075 T./h. of monoammonium phosphate $NH_4H_2PO_4$
0.500 T./h. of water (3) 14.816 T./h. of alcoholic solution, discharged at 11, containing:

0.158 T./h. of ammonium nitrate $NH_4NO_3$
0.075 T./h. of monoammonium phosphate $NH_4H_2PO_4$
1.444 T./h. of water
13.204 T./h. of isobutyl alcohol As disclosed in both preceding examples, the alcoholic solution is washed with water, supplied at 12, in washer 13, alcohol being recycled via 14 and 3 to extraction battery 2 and aqueous solution of ammonium nitrate, discharged at 15, being mixed with solution 10 to valorize salt contained therein. As disclosed in Examples 3 and 4, $P_2O_5$ yield as $NH_4H_2PO_4$ is higher than 90%.

EXAMPLE 7

An extract containing 5.00% of phosphoric acid ($H_3PO_4$), 2.40% of nitric acid ($HNO_3$), 16% water and 76.60% of isoamyl alcohol is ammoniated up to pH 3.5. Monoammonium phosphate precipitates with a yield of 15%.

What we claim is:

1. In a process for the preparation of monoammonium phosphate by ammoniation of mixtures of phosphoric and nitric acids in the presence of at least a partially water-miscible $C_1$ to $C_8$ alkanol whereby the monoammonium phosphate is recovered by precipitation the improvement wherein the alkanolic solution to be ammoniated contains 16 to 8% of water.

2. Process according to claim 1 wherein the alkanolic solution contains 14 to 8% water.

3. Process according to claim 1 in which the alkanolic solution to be ammoniated is obtained by extracting phosphoric and nitric acid from an aqueous solution containing said acids and mineral salts or impurities by means of a partially miscible alkanol, the alkanolic extract containing nitric and phosphoric acids is separated from an aqueous solution containing the mineral salts or impurities, the water concentration of the extract is adjusted and the extract is ammoniated.

4. Process according to claim 3 in which the aqueous solution containing phosphoric and nitric acids is obtained by reaction of phosphate ore with nitric acid.

5. Process according to claim 3 according to which the alkanolic extract is purified with water and the water concentration of the extract is adjusted in the purification step.

References Cited

UNITED STATES PATENTS

| | | | |
|---|---|---|---|
| 3,326,667 | 6/1967 | De Rooij | 71—39 |
| 3,363,978 | 1/1968 | De Rooij et al. | 23—165 |
| 3,415,619 | 12/1968 | Young | 23—107 |

OSCAR R. VERTIZ, Primary Examiner

G. A. HELLER, Assistant Examiner

U.S. Cl. X.R.

23—103, 71—39